(12) United States Patent
Clifford et al.

(10) Patent No.: US 8,702,078 B2
(45) Date of Patent: Apr. 22, 2014

(54) MAGNETIC TOOL FOR ROBOTS

(75) Inventors: Scott J. Clifford, Rochester Hills, MI (US); Paul D. Copioli, Sterling Heights, MI (US); Marcin Gora, Shelby Township, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 937 days.

(21) Appl. No.: 12/187,535

(22) Filed: Aug. 7, 2008

(65) Prior Publication Data

US 2009/0039579 A1 Feb. 12, 2009

Related U.S. Application Data

(60) Provisional application No. 60/955,160, filed on Aug. 10, 2007.

(51) Int. Cl.
*B25B 11/00* (2006.01)
*B23Q 3/157* (2006.01)
*B23Q 15/22* (2006.01)

(52) U.S. Cl.
USPC ................................. 269/8; 483/7; 483/10

(58) Field of Classification Search
USPC ............................................................ 269/8
See application file for complete search history.

(56) References Cited

U.S. PATENT DOCUMENTS

| | | | | |
|---|---|---|---|---|
| 3,196,320 A | * | 7/1965 | Mauting | 361/144 |
| 4,547,665 A | | 10/1985 | Little et al. | |
| 4,581,583 A | * | 4/1986 | Van Vliet et al. | 324/321 |
| 4,700,932 A | * | 10/1987 | Katsuno | 267/136 |
| 4,793,053 A | * | 12/1988 | Zuccaro et al. | 279/4.01 |
| 4,807,486 A | * | 2/1989 | Akeel et al. | 74/490.06 |
| 4,946,336 A | * | 8/1990 | Larsson | 414/744.2 |
| 5,078,140 A | * | 1/1992 | Kwoh | 600/417 |
| 5,231,352 A | | 7/1993 | Huber | |
| 5,286,160 A | * | 2/1994 | Akeel et al. | 414/744.3 |
| 5,301,899 A | * | 4/1994 | Sato | 242/288 |
| 5,577,902 A | * | 11/1996 | Todo et al. | 414/735 |
| 5,813,712 A | * | 9/1998 | Mozelt | 294/65.5 |
| 5,866,874 A | | 2/1999 | Haczynski et al. | |
| 5,941,679 A | | 8/1999 | Foti et al. | |
| 5,954,446 A | * | 9/1999 | Ireland | 403/11 |
| 5,989,342 A | * | 11/1999 | Ikeda et al. | 118/52 |
| 6,145,403 A | * | 11/2000 | Aschenbrenner et al. | 74/490.01 |
| 6,290,275 B1 | * | 9/2001 | Braam et al. | 294/86.4 |
| 6,336,567 B1 | * | 1/2002 | Hyobu | 220/230 |
| 6,380,733 B1 | * | 4/2002 | Apel et al. | 324/207.2 |
| 6,398,871 B1 | * | 6/2002 | Hur | 118/323 |
| 6,508,427 B2 | * | 1/2003 | Huettenegger et al. | 242/340 |

(Continued)

*Primary Examiner* — Alvin Grant
(74) *Attorney, Agent, or Firm* — Fraser Clemens Martin & Miller LLC; William J. Clemens

(57) ABSTRACT

A magnetic tool to enable a robot arm to grip a metallic workpiece includes a hollow housing having a coupling member adapted to attach the tool to the robotic arm. A sleeve depends from the housing having a shaft slidably received therein. The shaft has a first end disposed in the housing and a second end extending axially outwardly from an open end of the sleeve. A magnetic member is disposed on the second end of the shaft. The magnetic member includes a main body having a cavity formed therein. A magnet is slidably disposed within the cavity and attached to an actuator adapted to adjust the distance between the magnet and an inner surface of a magnetic face of the main body of the magnetic member to vary the magnetic attraction force at the magnetic face.

20 Claims, 2 Drawing Sheets

(56) References Cited

U.S. PATENT DOCUMENTS

| | | | |
|---|---|---|---|
| 6,723,106 B1* | 4/2004 | Charles et al. | 606/130 |
| 6,847,181 B2* | 1/2005 | Brooks et al. | 318/568.11 |
| 6,877,729 B2* | 4/2005 | Lin et al. | 269/25 |
| 6,931,304 B1* | 8/2005 | Miller et al. | 700/245 |
| 6,988,433 B2* | 1/2006 | LeClair | 81/487 |
| 7,202,658 B2* | 4/2007 | Ketelaars et al. | 324/207.24 |
| 7,291,802 B2* | 11/2007 | Muller et al. | 219/99 |
| 7,377,883 B1* | 5/2008 | Blanton | 482/90 |
| 7,518,084 B2* | 4/2009 | Schmitt et al. | 219/98 |
| 7,578,649 B2* | 8/2009 | Caveney et al. | 414/744.5 |
| 7,770,826 B2* | 8/2010 | Ballu et al. | 239/703 |
| 8,104,591 B2* | 1/2012 | Barefoot | 188/267.2 |
| 2002/0027138 A1* | 3/2002 | Hyobu | 220/230 |
| 2006/0182595 A1* | 8/2006 | Lundstrom et al. | 414/695.8 |
| 2007/0251923 A1* | 11/2007 | Muller et al. | 219/54 |
| 2008/0046122 A1* | 2/2008 | Manzo et al. | 700/245 |
| 2008/0214925 A1* | 9/2008 | Wilson et al. | 600/410 |
| 2009/0088775 A1* | 4/2009 | Swarup et al. | 606/130 |
| 2009/0289401 A1* | 11/2009 | Nagato | 269/8 |

* cited by examiner

MAGNETIC TOOL FOR ROBOTS

CROSS-REFERENCE TO RELATED APPLICATION

This application claims the benefit of U.S. provisional patent application Ser. No. 60/955,160 filed Aug. 10, 2007.

FIELD OF THE INVENTION

The present invention relates generally to a magnetic tool to enable a robot to manipulate a workpiece, and in particular to a magnetic tool wherein a magnetic force thereof can be varied to accommodate a variety of workpieces.

BACKGROUND OF THE INVENTION

A newly manufactured automobile body is typically painted with the doors installed. During the painting process, the doors are moved from a closed position to an open position to facilitate the painting of an interior of the automobile body. The doors are returned to the closed position when the painting of the interior of the automobile body is completed. Robotic devices featuring a specially adapted tool disposed at the end of an articulated arm are typically employed to grip the doors during the opening and closing process. The automobile hood, tailgate and trunk cover can also be installed on the automobile body and must also be opened and closed during the painting process, similar to the doors.

One approach to gripping the doors has been the use of a magnetic tool adapted to attract the door to move to the open position and release the door to permit a closure thereof. One such magnetic tool is disclosed in commonly owned U.S. Pat. No. 5,941,679, hereby incorporated herein by reference in its entirety. The prior art magnetic tools typically have a fixed magnetic force at an outer surface of the tool to contact the door of the automobile. The fixed magnetic force limits the usability of the tools on varying body styles of doors or variations in the pull strength and release strength required to open and close a particular body style door. The modern automotive paint line is typically adapted to receive multiple automotive body styles. The magnetic tooling of the prior art does not provide the necessary flexibility in magnetic force to accommodate the different automotive body styles.

The magnetic force of the current magnetic tools is established by manually configuring the tool to achieve the desired magnetic force. The number of magnets, strength of the magnets, and distance between the magnets and the outer surface of the tool can all be varied to achieve a desired force to open and close a particular body style door. If the tool has insufficient magnetic force, the tool may prematurely release the door during the opening or closing process, which interferes with the painting process. If the magnetic force is too high, the pull force required to release the tool from the door may result in undesirable damage to the tool or the door.

Additionally, the magnetic tools of the prior art typically include a number of metal components. An electrostatic painting process is typically employed in the painting of newly manufactured automobile bodies. The metallic components of the tools attract the charged paint droplets and results in increased cleaning requirements for the tooling. Accordingly, the metal components must be electrically grounded.

It would be desirable to develop a magnetic tool for a robotic arm having a magnetic force that can be adjusted, wherein the tool is adapted to minimize an accumulation of paint on the tool.

SUMMARY OF THE INVENTION

Compatible and attuned with the present invention, a magnetic tool for a robotic arm having a magnetic force that can be adjusted, wherein the tool is adapted to minimize the accumulation of paint on the tool, has surprisingly been discovered.

In one embodiment of the present invention, a magnetic tool comprises a housing adapted to be coupled to a robotic arm, and a magnetic member adjustably coupled to the housing and adapted to be magnetically attached to a workpiece, the magnetic member providing a selectively variable magnetic force in respect of the metallic workpiece.

In another embodiment of the present invention, a magnetic tool for a robotic arm comprises a hollow housing adapted to attach the tool to the robotic arm, a sleeve depending from the housing, the sleeve having an open end and a longitudinal axis, a shaft slidably received in the sleeve, the shaft having a first end disposed in the sleeve adjacent the housing and a second end extending axially outwardly from the open end of the sleeve, and a magnetic member including a magnet, the magnetic member disposed on the second end of the shaft and adapted to magnetically attach to a metallic workpiece, wherein the magnet is selectively moveable to change a magnetic force of the magnet in respect of the metallic workpiece.

In another embodiment of the present invention, a magnetic tool for a robotic arm comprises an electrically non-conductive hollow housing having a coupling member adapted to attach the tool to the robotic arm, an electrically non-conductive sleeve depending from the housing, the sleeve having an open end and a longitudinal axis, an electrically non-conductive shaft slidably and rotatably received in the sleeve having a first end disposed in the housing and a second end extending outwardly from the open end of the sleeve, a spring adapted to urge the shaft axially outwardly from the open end of the sleeve, a fiber optic position sensor disposed within the housing adapted to detect a vertical position and/or rotary position of the shaft with respect to the housing, a magnetic member disposed on the second end of the shaft adapted to magnetically attach to a metallic workpiece, the magnetic member including an electrically non-conductive main body having a cavity formed therein, a magnet slidably disposed within the cavity, a first end of the magnet adjacent an inner surface of a magnetic face of the main body and a second end of the magnet attached to a pneumatic cylinder adapted to move the magnet toward and away from the inner surface of the magnetic face, and a conduit extending through the housing and the shaft adapted to provide fluid communication between a source of pressurized air and the pneumatic cylinder disposed within the magnetic member to selectively move the magnet to change a magnetic force of the magnet in respect of the metallic workpiece.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The U.S. provisional patent application Ser. No. 60/955,160 filed Aug. 10, 2007 is hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner.

Figure 1:
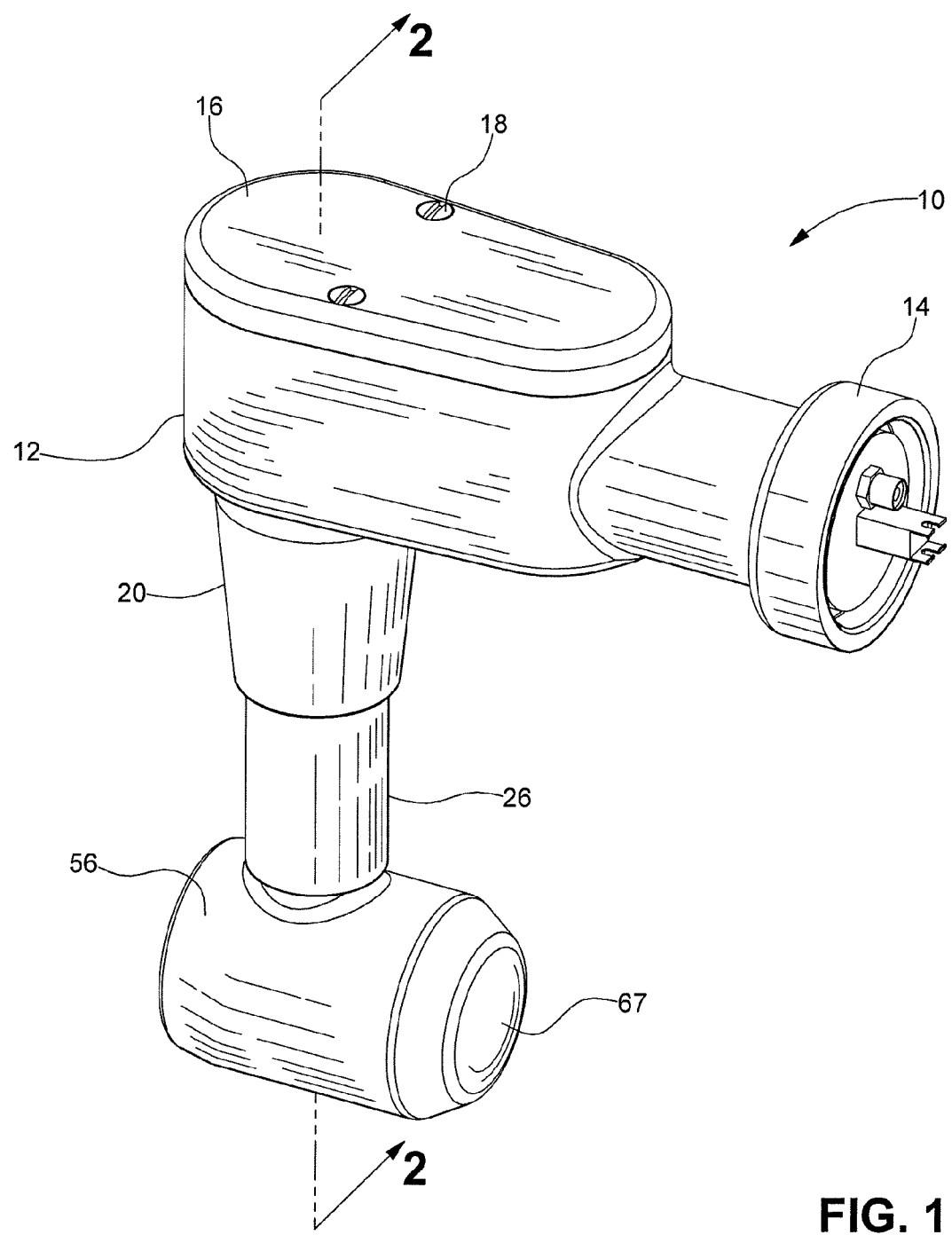
FIG. 1 is a perspective view of a magnetic tool according to an embodiment of the present invention.

FIG. 1 shows a magnetic tool 10 for a robotic arm according to an embodiment of the invention. The tool 10 includes a hollow housing 12 having a coupling member 14 to facilitate the attachment of the tool 10 to the robotic arm. A removable cover 16 is disposed on the housing 12 to facilitate access to the hollow interior of the housing 12. In the embodiment shown, the cover 16 is secured to the housing 12 with threaded fasteners 18. It should be understood that the cover 16 may be secured to the housing 12 by other means such as other conventional fasteners, a frictional fit, and spring clips, for example.

A sleeve 20 having a longitudinal axis L (FIG. 2) depends from the housing 12. As more clearly shown in FIG. 2, a first end 22 of the sleeve 20 includes an opening formed therein in communication with the hollow interior of the housing 12. A second end 24 of the sleeve 20 also includes an opening formed therein. A shaft 26 is slidably received in the sleeve 20. The shaft 26 has a first end 28 disposed in the interior of the housing 12 and a second end 30 extending axially outwardly from the opening at the second end 24 of the sleeve 20.

A clevis 32 is mounted at the first end 28 of the shaft 26. In the embodiment shown, the clevis 32 is mounted to the first end 28 of the shaft 26 by forming threads on the first end of the shaft 26, and securing the clevis 32 to the shaft 26 with a threaded nut 34. It should be understood that other means may be used to mount the clevis 32 such as a snap ring, for example. The clevis 32 includes a bottom planar surface 36 and a radially outwardly extending tab 38. The bottom planar surface 36 of the clevis 32 abuts a planar member 40 formed on an interior surface of the housing 12 and circumscribing the shaft 26. The bottom planar surface 36 of the clevis 32 and the planar member 40 of the housing 12 cooperate to maintain the first end 28 of the shaft 26 within the interior of the housing 12 and allow the shaft 26 to rotate with respect to the longitudinal axis of the sleeve 20. A biasing spring 42 is disposed between the clevis 32 and housing 12 to urge the shaft 26 to a desired rotational position or a home position with respect to the sleeve 20.

Figures 2, 3:
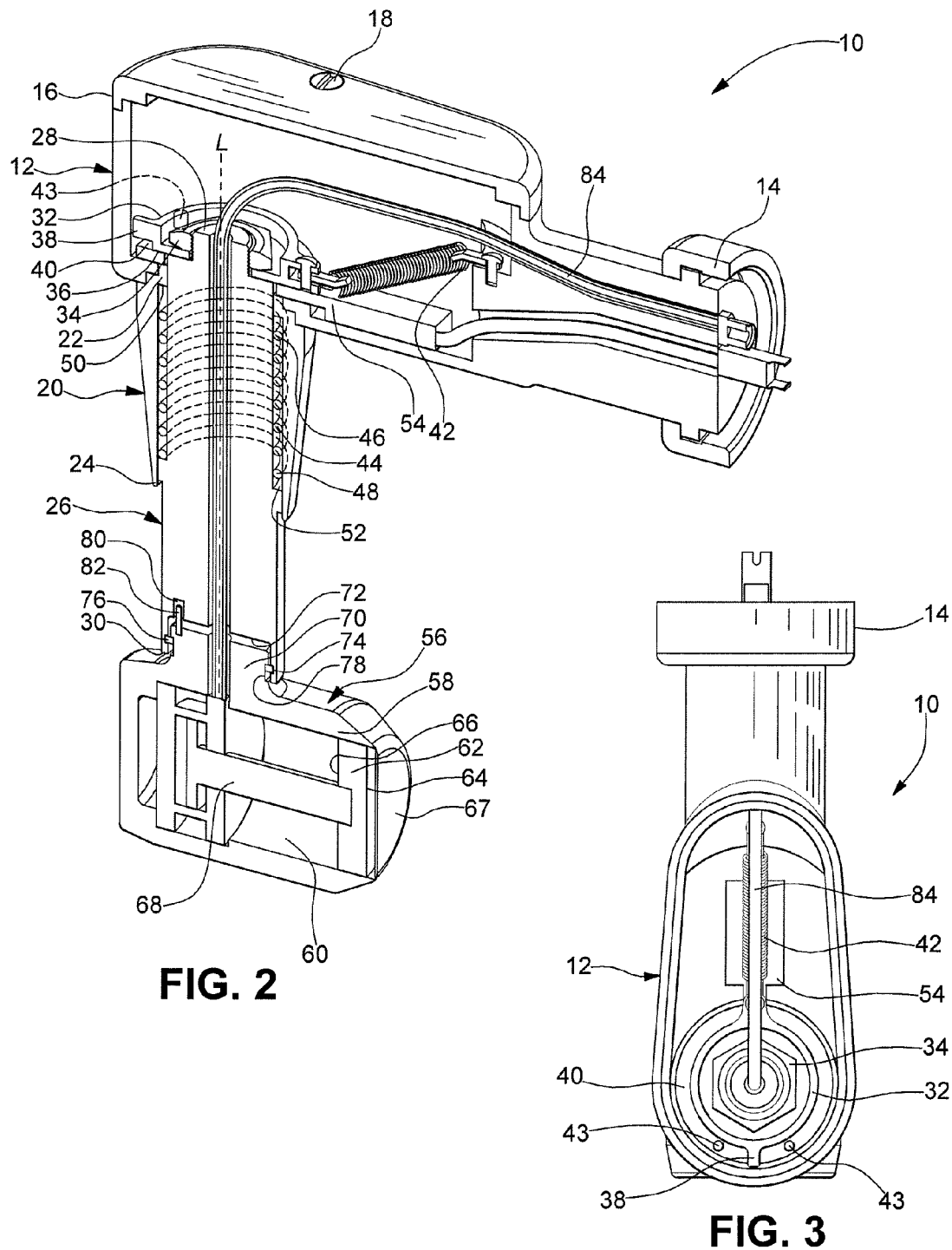
FIG. 2 is a sectional view of the magnetic tool shown in FIG. 1 taken along line 2-2.
FIG. 3 is a top plan view of the magnetic tool shown in FIG. 1 with a cover for a housing of the tool removed.

At least one stop rod 43 is provided in the interior of the housing 12. As shown in FIG. 3, a pair of stop rods 43 is provided which rods are attached to the planar member 40. The stop rods 43 are located adjacent the clevis 32 and are adapted to engage the tab 38 of the clevis 32 to restrict the rotation of the shaft 26 with respect to the sleeve 20.

A spring 44 is disposed between the sleeve 20 and the shaft 26 to urge the shaft 26 to a home position seating the planar surface 36 of the clevis 32 against the planar member 40 of the housing 12. In the embodiment shown the spring 44 is a coil compression spring having an upper end 46 and a lower end 48. The spring 44 surrounds at least a portion of the shaft 26. The upper end 46 of the spring 44 abuts an inner surface 50 of the sleeve 20 and the lower end 48 abuts a shoulder 52 formed on the shaft 26. It should be understood that other configurations of the sleeve 20, the shaft 26, and the spring 40 may be used as desired to urge the shaft 26 in a direction axially outwardly from the opening at the lower end 24 of the sleeve 20.

A position sensor 54 is disposed within the housing 12. The position sensor 54 is adapted to detect a vertical position of the shaft 26 with respect to the housing 12. In the embodiment shown, the position sensor 54 is a fiber optic sensor having a light sending and receiving pickup. It should be understood that other sensors may be used such as a proximity sensor, for example. The position sensor 54 is in communication with a receiving unit located remotely from the tool 10. The position sensor 54 is adapted to provide a signal to the receiving unit indicating the vertical position of the shaft 26. As an alternative, the position sensor 54 is adapted to detect a rotary position of the shaft 26 with respect to the housing 12 instead of or in addition to the vertical position.

A magnetic member 56 is disposed on the second end 30 of the shaft 26 and is adapted to magnetically attach to a metallic workpiece. The magnetic member 56 includes a hollow main body 58 having a cavity 60 formed therein. A magnet 62 having a first end 64 and a second end 66 is slidably disposed within the cavity 60. The first end 64 of the magnet 62 is disposed adjacent an inner surface of a magnetic face 67 of the main body 58. The second end 66 the magnet 62 is attached to an actuator 68 adapted to move the magnet 62 toward and away from the inner surface of the magnetic face 67 to vary the magnetic force at the magnetic face 67. In the embodiment shown, the actuator 68 is a pneumatic cylinder. It should be understood that other actuators may be used as desired such as a hydraulic actuator, for example. Additionally, in the embodiment shown, the magnet 62 is a permanent magnet. It should be understood that an electromagnet could also be used either with an actuator or independently to achieve the objective of variable magnetic force at the magnetic face 67.

The magnetic member 56 includes a protrusion 70 extending laterally outwardly from the main body 58 having an outer periphery and an upper surface. The protrusion is adapted to be received by a cavity 72 formed in the second end 30 of the shaft 26. An annular groove 74 is formed in the cavity 72 and is adapted to receive an outer circumferential edge of a snap-coupling 76. A cooperating annual groove 78 is formed in the outer periphery of the protrusion 70 which is adapted to receive an inner circumferential edge of the snap-coupling 76. A width of the annular groove 78 is greater than the thickness of the snap-coupling 76 which allows the magnetic member to move upwardly and downwardly on the snap-coupling 76 with respect to the shaft 26. The snap-coupling 76 facilitates a rotational movement to the magnetic member 56 with respect to the shaft 26. A bore 80 is formed in the shaft 26 at the closed end of the cavity 72. The bore 80 is adapted to receive a locator pin 82 extending upwardly from the upper surface of the protrusion 70 of the magnetic member 56. The bore 80 and pin 82 cooperate to restrict the rotational movement of the magnetic member 56 with respect to the longitudinal axis of the shaft 26.

A conduit 84 extends through the housing 12 and the shaft 26 to provide fluid communication between a source of pressurized fluid and the actuator 68 disposed within the cavity 60 of the magnetic member 56. In the embodiment shown, the source of pressurized fluid provides pressurized air which is employed to energize the actuator 68 to move the magnet 62 toward and away from the inner surface of the magnetic face 67 of the magnetic member 56. It should be understood that other fluids may be used with other types of actuators such as hydraulic fluids with a hydraulic cylinder actuator, for example.

In use on a typical automotive body paint line, the robot arm positions the tool 10 to contact and magnetically attach to the door of the automobile body. Once the tool 10 is magnetically attached to the door, the robot arm applies a force to the tool 10 causing the magnetic member 56 and the shaft 26 to overcome the bias of the spring 44 and move toward the housing 12. The position sensor 54 detects the movement of the shaft 26 and provides a signal to the robot that indicates the tool 10 is magnetically attached to the door. The robot can then open the door to facilitate the painting of the interior portions of the automobile body as desired. The attachment of the magnetic member 56 to the shaft 26 with the snap-coupling 76 provides both vertical and rotational movement to the magnetic member 56 with respect to the shaft 26. This movement facilitates the secure attachment of the magnetic face 67 to the door and accommodates any out of plane movement of the door as it is moved between the closed and the open position.

After the painting of the interior of the automobile body is completed, the robot returns the door to the closed position. The actuator 68 is then caused to move the magnet 62 away from the inner surface of the magnetic face 67 to reduce the magnetic force at the magnetic face 67, resulting in a reduced magnetic force for detaching the tool 10 from the door. The robot can then detach the tool 10 from the door using an amount of force that will not damage either the tool 10 or the door. When the tool 10 is released from the door, the spring 40 urges the magnetic member 56 and the shaft 26 axially outwardly from the housing 12. The position sensor 54 detects the movement of the shaft 26 and provides a signal to the robot that indicates the tool 10 has been released from the door of the automobile body.

The magnetic tool 10 provides a variable magnetic force at the magnetic face 67. The magnetic force can be adjusted as desired by causing the actuator 68 to move the magnet 62 toward the inner surface of the magnetic face 67 (increasing the magnetic force) or away from the inner surface of the magnetic face 67 (decreasing the magnetic force). The necessary pull strength and release strength to both adequately grip a metallic workpiece and then release a metallic workpiece without damaging the workpiece can be achieved by adjusting the distance between the magnet 62 and the magnetic face 67.

Favorable results have been obtained by producing the external components of the tool 10 with a non-electrically conductive material. The magnetic tool 10 is typically employed to facilitate the painting of a newly manufactured automobile body, although it should be understood that the magnetic tool can be used for applications other than painting newly manufactured automobile bodies. The painting of automobile bodies is typically accomplished using electrostatic painting. By producing the external components; namely the housing, cover, coupling member, sleeve, shaft, and main body of the magnetic member, from a non-electrically conductive material, the amount of paint attracted to the tool 10 is minimized. A higher percentage of paint is then deposited on the workpiece being painted, which reduces the consumption of paint and provides a cost savings to a manufacturer employing the tool 10 in an electrostatic painting process. Further, by minimizing the amount of paint attracted to the tool 10, the maintenance costs associated with cleaning the tool and a risk of failure of the tool 10 due to paint accumulation is minimized.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A magnetic tool for attaching a robotic arm to a workpiece of a vehicle body comprising:
    a housing attached to a robotic arm; and
    a magnetic member adjustably coupled to the housing for magnetic attachment of the tool to a movable workpiece of a vehicle body at a magnetic face of the tool, the magnetic member including a magnet being selectively moveable relative to the magnetic face for providing a selectively variable magnetic force at the magnetic face in respect of attracting the workpiece without damaging the workpiece, the magnet being automatically moved by an actuator energized through the robotic arm to increase the magnetic force to a first strength sufficient to grip the workpiece while the robotic arm moves the workpiece relative to the vehicle body and to decrease the magnetic force to a second strength sufficient to release the workpiece from the tool.

2. The magnetic tool according to claim 1 wherein said magnetic member includes a permanent magnet.

3. The magnetic tool according to claim 1 wherein said magnetic member includes an electro-magnet.

4. A magnetic tool for attaching a robotic arm to a workpiece of a vehicle body comprising:
    a hollow housing attached to a robotic arm;
    a sleeve depending from said housing, said sleeve having an open end and a longitudinal axis;
    a shaft being at least one of slidably and rotatably received in said sleeve, said shaft having a first end disposed in said sleeve adjacent to said housing and a second end extending axially outwardly from said open end of said sleeve; and
    a magnetic member including a magnet, said magnetic member disposed on said second end of said shaft and adapted to magnetically attach the tool to a movable workpiece of a vehicle body at a magnetic face of the tool without damaging the workpiece, wherein said magnet is selectively moveable relative to said magnetic face to change a magnetic attraction between said magnet and the workpiece, said magnet being automatically moved by an actuator energized through the robotic arm to increase the magnetic force to a first strength sufficient to grip the workpiece while the robotic arm moves the workpiece relative to the vehicle body and to decrease the magnetic force to a second strength sufficient to release the workpiece from the tool.

5. The magnetic tool according to claim 4 further comprising a position sensor disposed in said housing, said position sensor detecting at least one of a vertical position and an angular position of said shaft with respect to said housing.

6. The magnetic tool according to claim 5 wherein said sensor is a fiber optic sensor having a light sending and receiving pickup.

7. The magnetic tool according to claim 4 further comprising a spring urging said shaft axially outwardly from said open end of said sleeve.

8. The magnetic tool according to claim 4 wherein a clevis is mounted at said first end of said shaft and a biasing spring is operatively connected to said clevis and said housing to urge said shaft to a rotational home position.

9. The magnetic tool according to claim 8 further comprising at least one stop rod disposed in said housing to engage said clevis for preventing said shaft from rotating within said sleeve beyond a selected maximum angular rotation with respect to the home position.

10. The magnetic tool according to claim 4 wherein said magnetic member further comprises a main body having a cavity formed therein and including said magnetic face, said magnet being slidably disposed within said cavity, a first end of said magnet adjacent an inner surface of said magnetic face of said main body and a second end of said magnet attached to said actuator for moving said magnet toward and away from said inner surface of said magnetic face.

11. The magnetic tool according to claim 10 further comprising a conduit extending through said housing and said shaft to provide fluid communication between a source of pressurized fluid and said actuator, wherein fluid from the source of pressurized fluid operates said actuator.

12. The magnetic tool according to claim 11 wherein said actuator is a pneumatic cylinder.

13. The magnetic tool according to claim 12 wherein the source of pressurized fluid is a pressurized air source.

14. The magnetic tool according to claim 4 wherein said housing includes a coupling member for attaching the tool to the robotic arm, and said housing, said coupling member, said sleeve, said shaft, and a main body of said magnetic member are produced from a non-electrically conductive material.

15. A magnetic tool for a robotic arm comprising:
an electrically non-conductive hollow housing having a coupling member for attaching the tool to the robotic arm;
an electrically non-conductive sleeve extending from said housing, said sleeve having an open end and a longitudinal axis;
an electrically non-conductive shaft slidably and rotatably received in said sleeve and having a first end disposed in said housing and a second end extending outwardly from said open end of said sleeve;
a spring urging said shaft axially outwardly from said open end of said sleeve;
a fiber optic position sensor disposed within said housing for detecting at least one of a vertical position and a rotary position of said shaft with respect to said housing;
a magnetic member disposed on said second end of said shaft to magnetically attach to a workpiece, said magnetic member including an electrically non-conductive main body having a cavity formed therein, a magnet slidably disposed within said cavity, a first end of said magnet adjacent an inner surface of a magnetic face of said main body and a second end of said magnet attached to a pneumatic cylinder for moving said magnet toward and away from said inner surface of said magnetic face; and
a conduit extending through said housing and said shaft for providing fluid communication between a source of pressurized air and said pneumatic cylinder disposed within said magnetic member to selectively move said magnet to change a magnetic attractive force between said magnet and the workpiece.

16. The magnetic tool according to claim 15 wherein a clevis is mounted at said first end of said shaft and a biasing spring is operatively connected to said clevis and said housing for urging said shaft to a rotational home position.

17. The magnetic tool according to claim 16 further comprising at least one stop rod disposed in said housing to engage said clevis for preventing said shaft from rotating beyond a selected maximum angular rotation with respect to the home position.

18. The magnetic tool according to claim 15 wherein said shaft includes a cavity formed in said second end, a surface of said cavity having an annular groove formed therein.

19. The magnetic tool according to claim 18 wherein said magnetic member includes a protrusion having an outer periphery and an upper surface, said outer periphery having an annular groove formed therein, wherein said cavity receives said protrusion of said magnetic member, and said annular groove formed in said surface of said cavity and said annular groove formed in said protrusion receive a snap coupling to attach said magnetic member to said shaft.

20. The magnetic tool according to claim 19 wherein a pin extends from said upper surface of said protrusion of said magnetic member and a bore is formed in said surface of said cavity of said shaft, said bore receiving said pin and cooperating therewith to restrict a rotational movement of said magnetic member with respect to a longitudinal axis of said shaft.

* * * * *